April 24, 1945.　　　H. J. BAUR ET AL　　　2,374,321
FARE REGISTERING MECHANISM
Filed Aug. 3, 1940　　　8 Sheets-Sheet 4
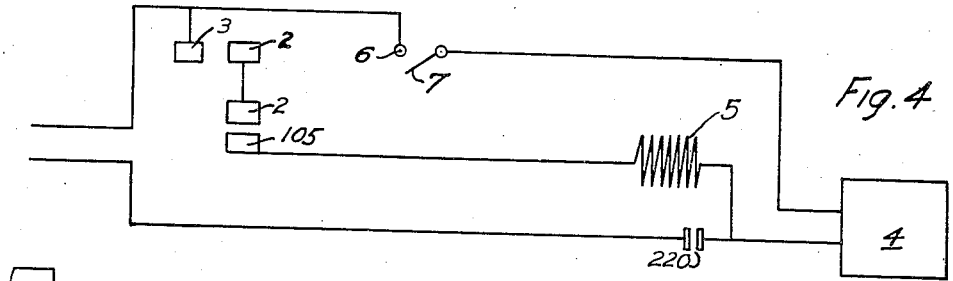
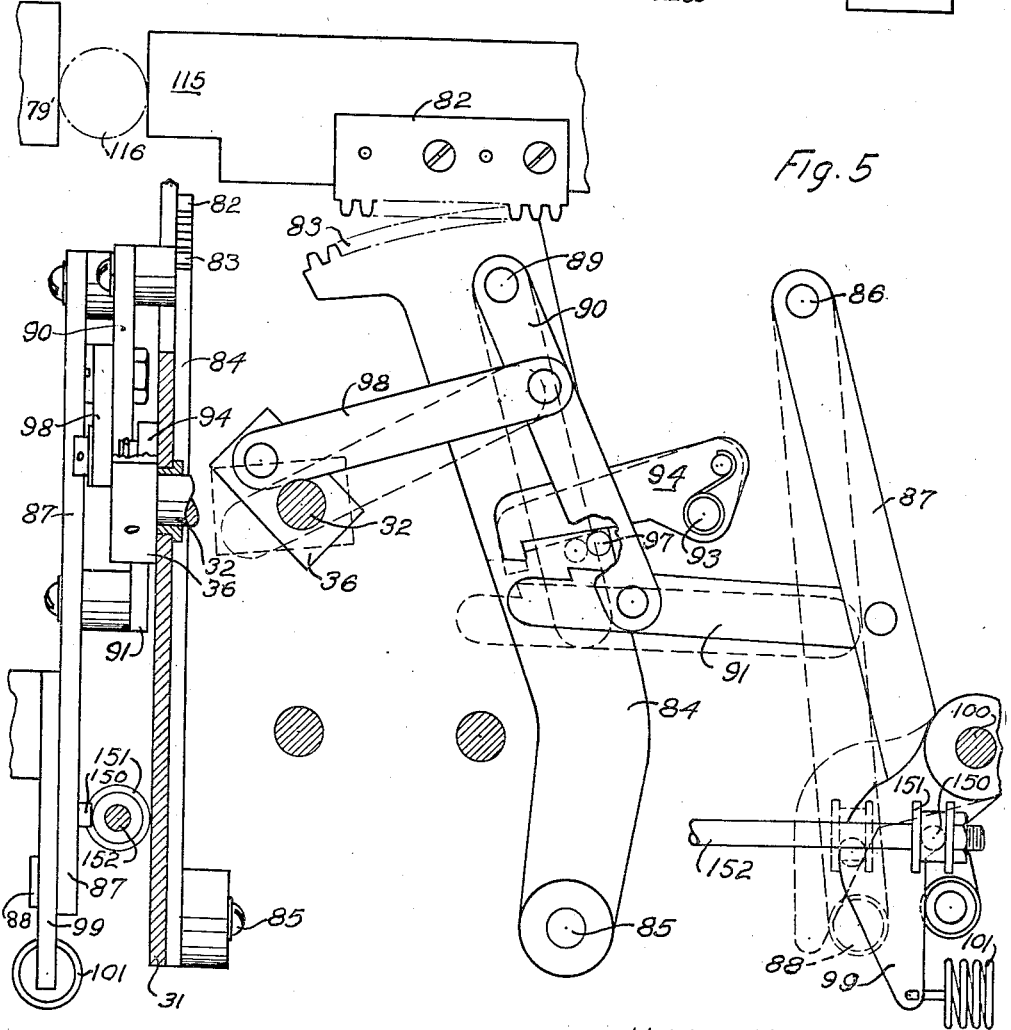
HUGO J. BAUR
THOMAS E. KULO
INVENTORS
BY Edmund W. E. Kamm
ATTORNEY.

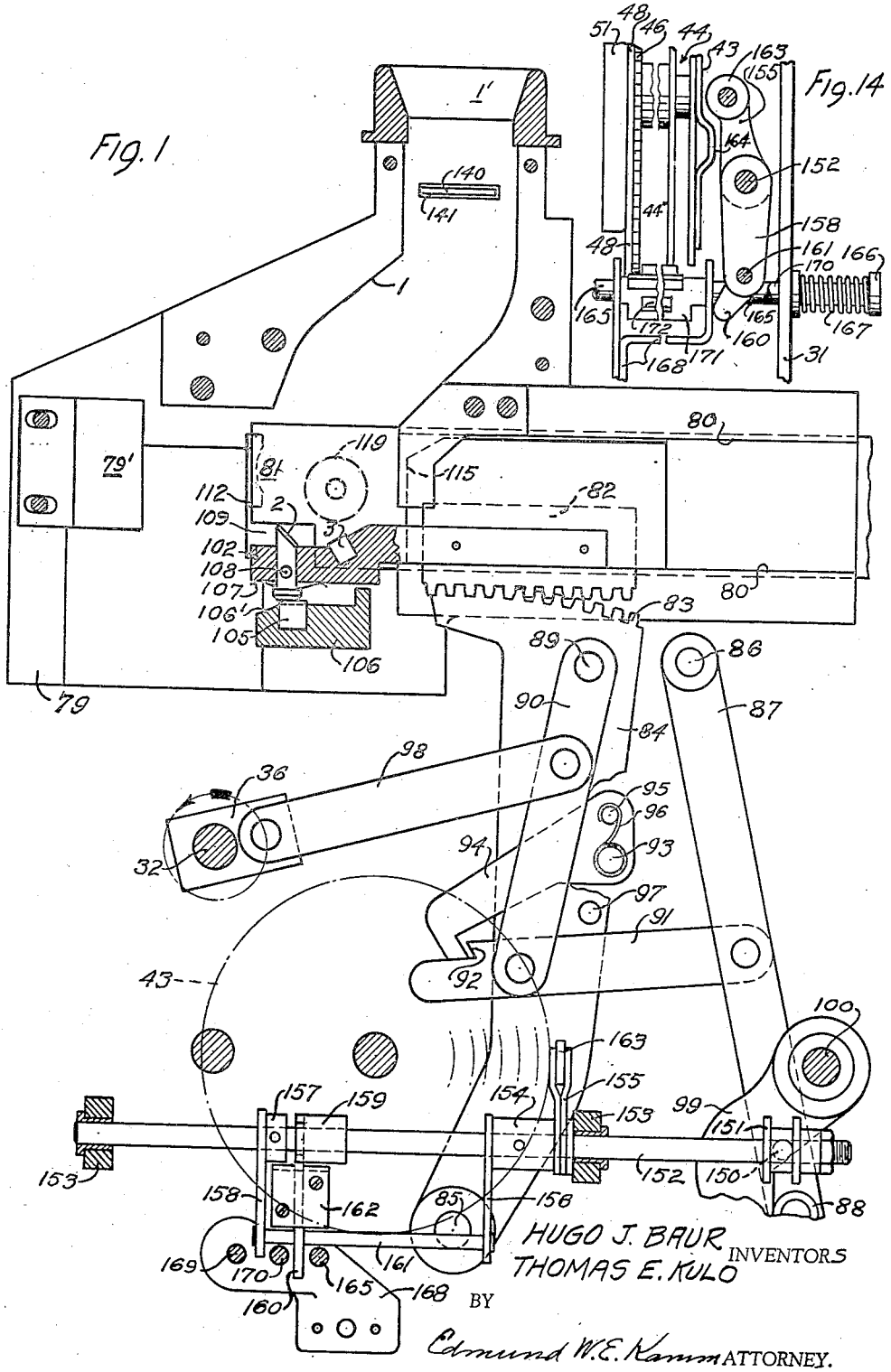

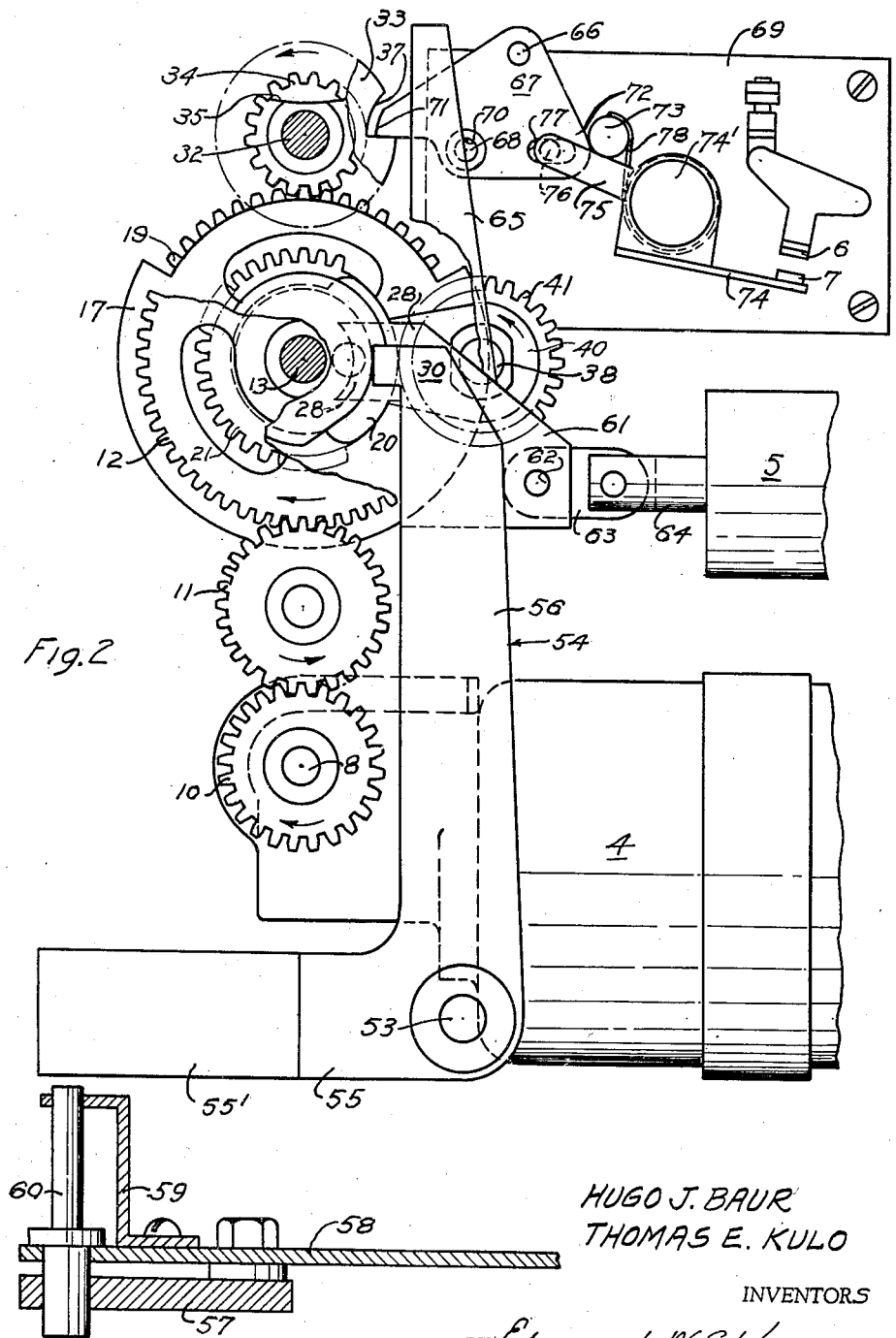

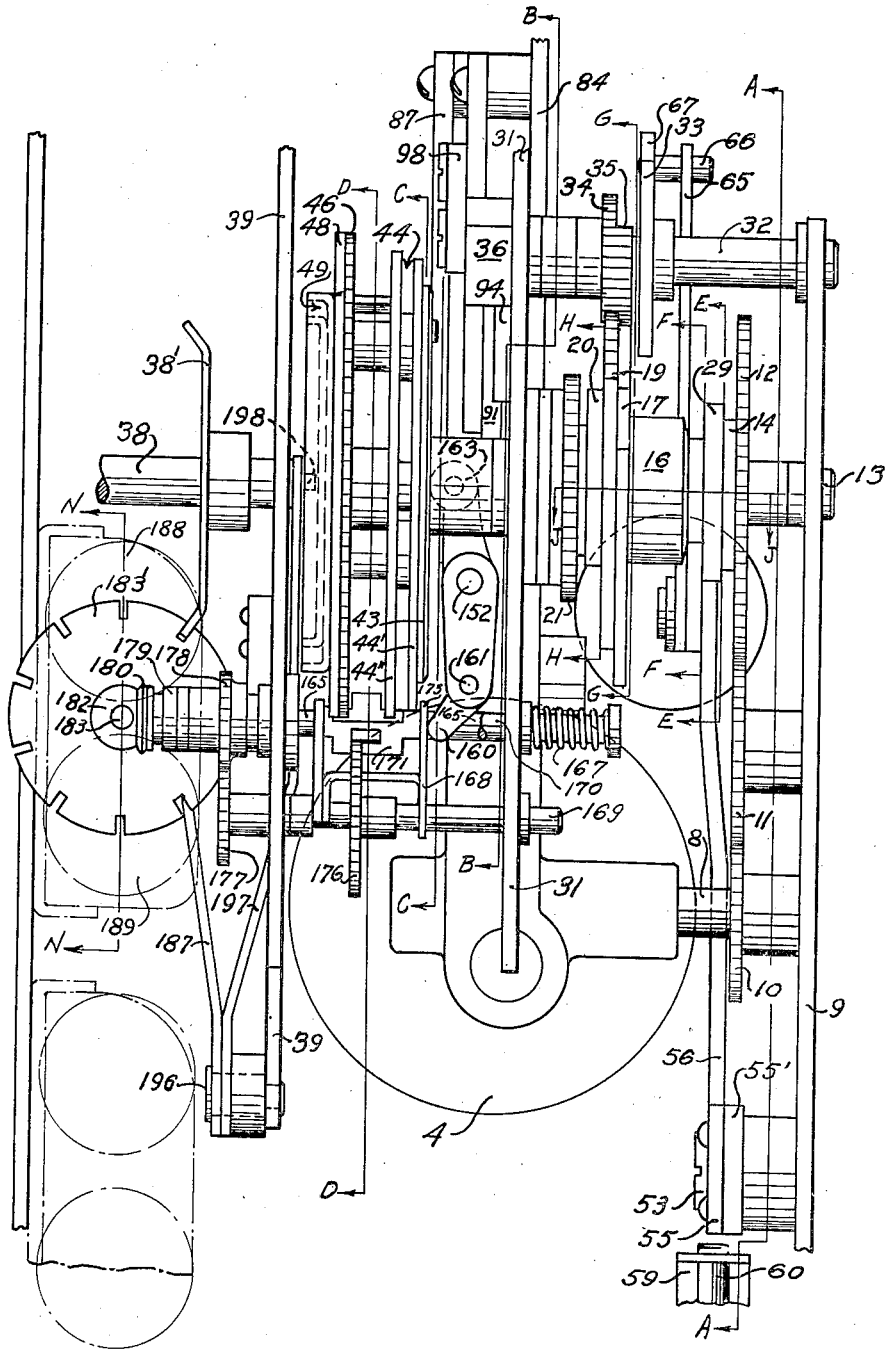

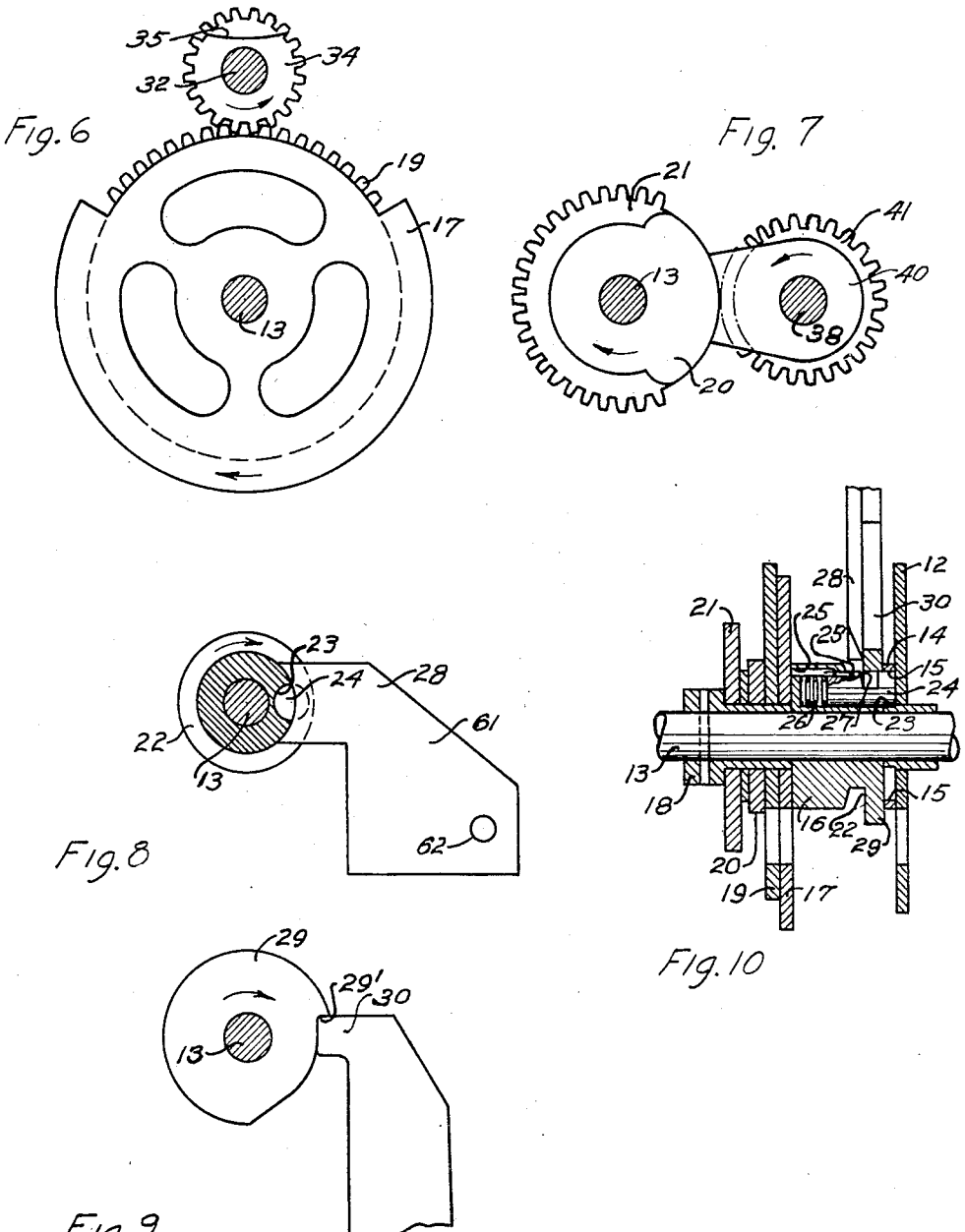

April 24, 1945.  H. J. BAUR ET AL  2,374,321

FARE REGISTERING MECHANISM

Filed Aug. 3, 1940   8 Sheets-Sheet 6

HUGO J. BAUR
THOMAS E. KULO INVENTORS

BY Edmund W. E. Kamm

ATTORNEY.

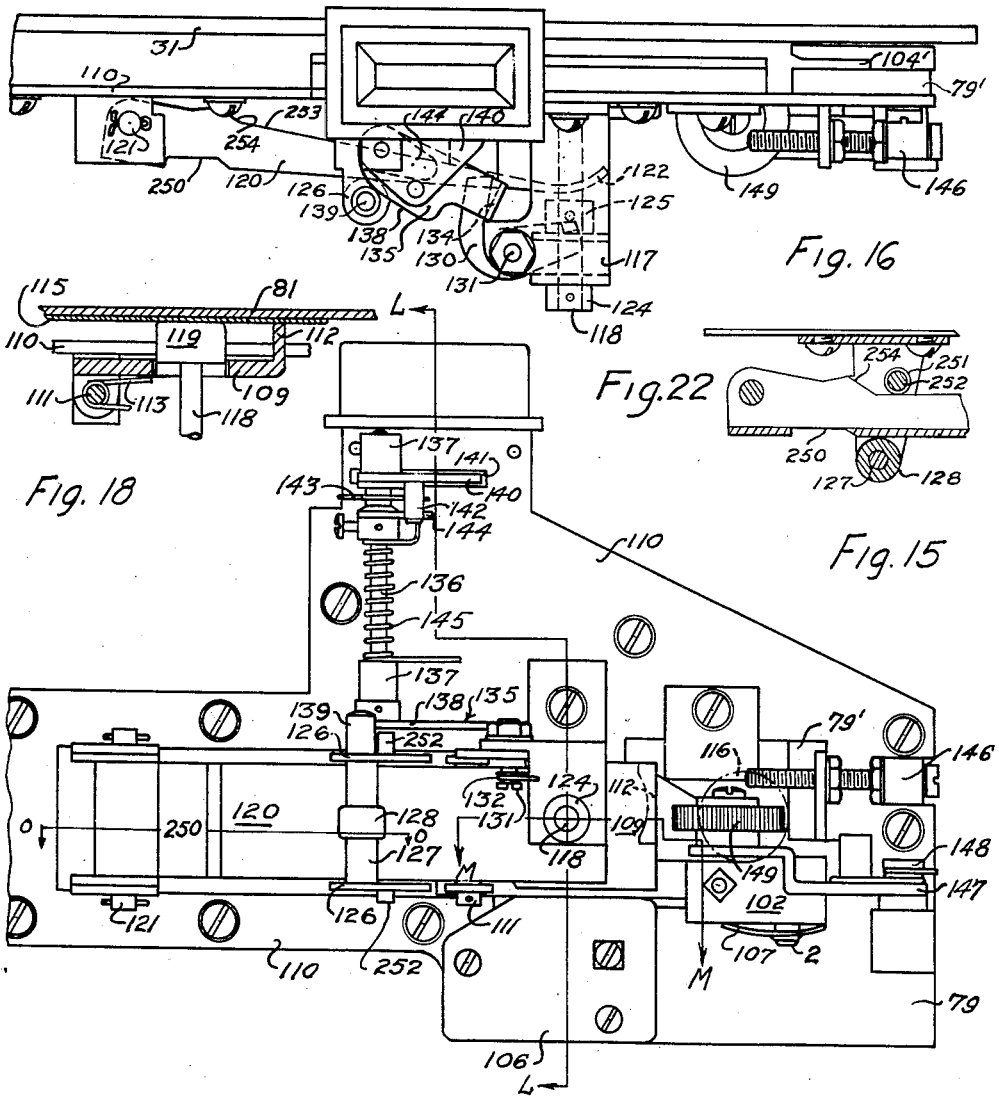

April 24, 1945.  H. J. BAUR ET AL  2,374,321
FARE REGISTERING MECHANISM
Filed Aug. 3, 1940  8 Sheets-Sheet 8
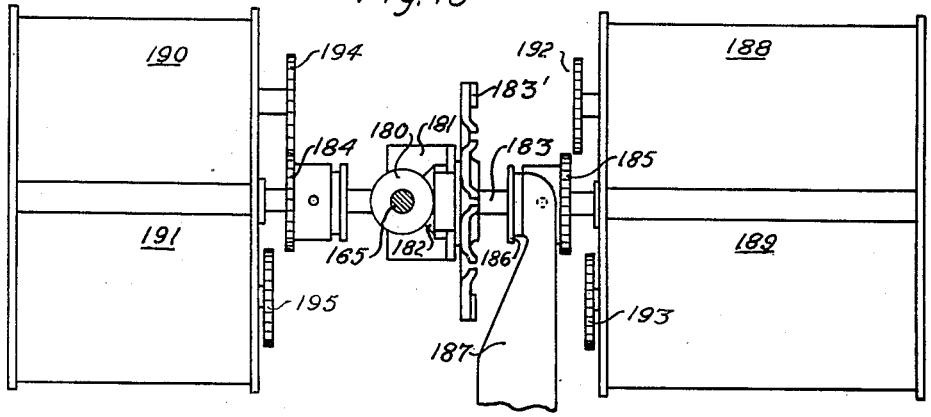
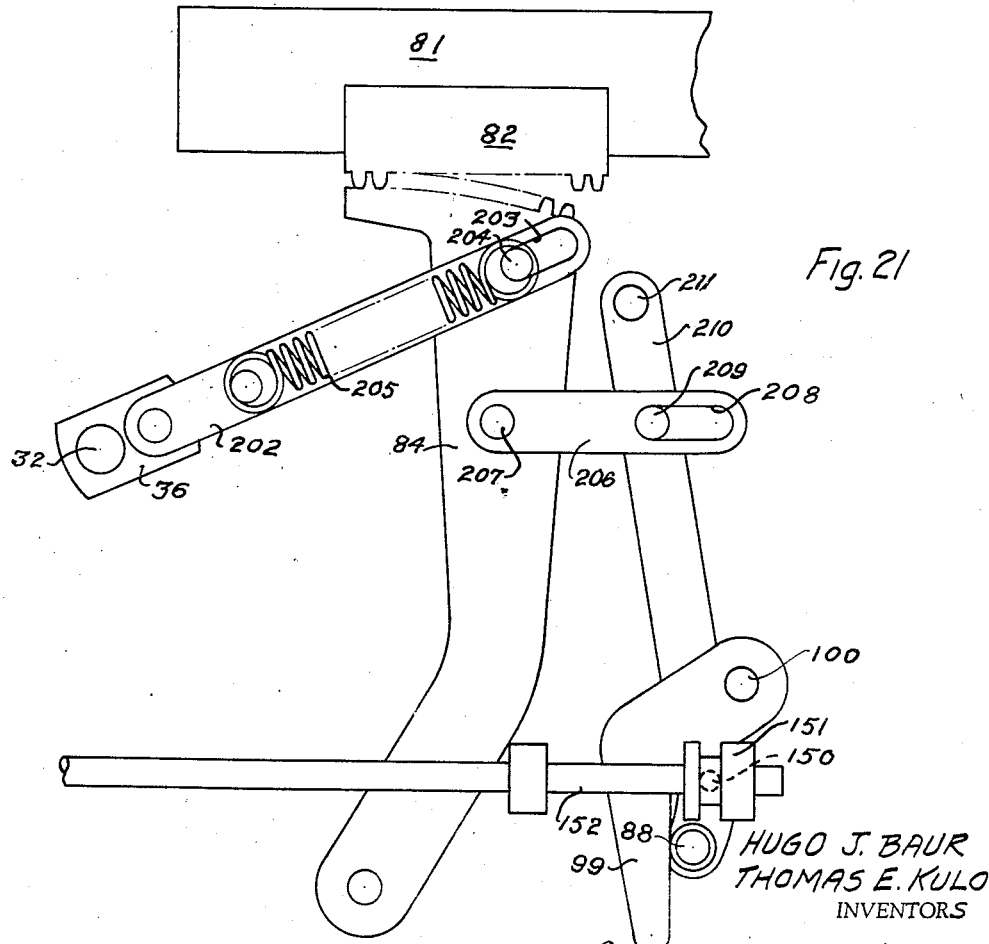
HUGO J. BAUR
THOMAS E. KULO
INVENTORS
BY Edmund W. E. K......
ATTORNEY.

Patented Apr. 24, 1945

2,374,321

UNITED STATES PATENT OFFICE 2,374,321

FARE REGISTERING MECHANISM

Hugo J. Baur and Thomas E. Kulo, Chicago, Ill., assignors, by mesne assignments, to City National Bank and Trust Company of Chicago, Chicago, Ill., as trustee Application August 3, 1940, Serial No. 350,312

21 Claims. (Cl. 235—29)

This invention relates to means for automatically calipering a check offered as a fare or other payment and for registering the value of such check on a register which is selected in accordance with the size of the check calipered. Further where a plurality of checks are offered, each will be calipered and registered individually.

It is an object of the invention to produce a fare register which will accurately measure any of a plurality of checks of assorted sizes and register the value of each.

It is another object of the invention to provide means for preventing the insertion of too many checks at one time.

Another object of the invention is to provide means for selecting the register which corresponds to the check being calipered and to actuate said register to accumulate the value of the check.

Still another object is to provide a cycling mechanism which controls the events of gripping the check, calipering it, connecting the proper register, registering the value of the check and returning the parts to normal to complete the cycle.

A further object of the invention is to provide a novel check calipering device having a power mechanism adapted to travel a predetermined fixed distance and which actuates a linkage having a check locking section and a selecting section throughout one phase of the cycle.

Still another object of the invention is to provide a device of the class described in which the check locking section of the linkage moves the distance required by the diameter of the check and the selecting section receives the remainder of the motion imparted by the motion of the power mechanism in completing the calipering phase of its cycle.

It is another object of the invention to provide a power driven register selecting mechanism which will connect and release in predetermined order a plurality of registers.

Still another object of the invention is to provide power actuated mechanism for advancing a selected register the distance required to register a unit amount.

A further object of the invention is to provide means for engaging the register driving means and for holding it in engagement for the time necessary to actuate the selected register and for thereafter disengaging the driving means.

It is still another object of the invention to provide a mechanism which will caliper all of the checks presented and stop.

It is also an object of my invention to provide a mechanism which will measure a check, condition a selector mechanism and thereupon come to rest whereupon a registering mechanism will begin its operation to register the value of the measured check and come to rest.

It is a further object of the invention to provide a mechanism in which after the registering mechanism has come to rest, the check measuring and selector conditioning mechanisms will again be actuated to release the check and to return to initial position.

It is a further object of the invention to provide means for receiving and arranging a plurality of checks in a horizontal stack, for applying a pressure to said stack and to provide mechanism for successively stripping off the outermost check for the measuring operation.

These and other objects will become apparent from a study of the following specification and the drawings which are attached hereto and made a part hereof and in which:

Figure 1 is a sectional view taken on the line B—B of Figure 3 showing the check chute and the check calipering mechanism in the check receiving position.

Figure 2 is a sectional view with parts broken away, taken on the line A—A of Figure 3 showing the power drive and the cycling mechanism.

Figure 3 is a side elevation showing the power drive, the cycling mechanism and the value selecting and register drive mechanism.

Figure 4 is a wiring diagram showing the motor, solenoid and control switches.

Figure 5 is an elevation showing the check calipering mechanism in various positions away from the coin receiving position shown in Figure 1.

Figure 6 is a section taken on the line G—G of Figure 3 showing part of the cycling means and locking means together with the crank shaft drive.

Figure 7 is a section taken on the line H—H of Figure 3 showing another part of the cycling and locking means together with the value selecting drive mechanism.

Figure 8 is a section taken on the line F—F of Figure 3 showing the clutch operating element in clutch disengaging position.

Figure 9 is a section taken on the line E—E of Figure 3 showing the lever holding cam and its follower.

Figure 10 is a section taken on the line J—J of Figure 3 showing the clutch mechanism in the motor drive.

Figure 11 is a section taken on the line C—C of Figure 3 showing the Geneva gear shift and control cams.

Figure 12 is a section taken on the line D—D of Figure 3 showing the register drive gear, its associated locking disc and the register selecting cam.

Figure 13 is a section taken on the line K—K of Figures 11 and 12.

Figure 14 is an elevation showing the value selecting connecting mechanism comprising a shiftable Geneva pinion.

Figure 15 is an elevation of the check receiving and feeding mechanism showing the slide in check calipering position.

Figure 16 is a top view of the mechanism of Figure 15.

Figure 17 is a sectional view taken on the line L—L of Figure 15.

Figure 18 is a sectional view taken on the line M—M of Figure 15.

Figure 19 is a view taken on the line N—N of Figure 3 showing the register selector mechanism.

Figure 20 is an elevation taken from the left of Figure 5.

Figure 21 is a modified form of check calipering linkage.

Figure 22 is a section taken on the line O—O of Figure 15 but showing the forked lever about to be rotated in a clockwise direction.

Referring now to Figure 1 the numeral 1 represents a check receiving chute at the bottom of which are disposed a pair of contacts 2, 3. A circuit shown in Figure 4 is energized upon insertion of a metal check in the chute. The word "check" is used throughout this specification to denote either a token or a coin.

As is clearly shown in Figures 2 and 4, the motor 4 and solenoid 5 are connected in the circuit. A second pair of contacts 6, 7 which are in parallel with the contacts 2, 3 are also provided to hold the circuit closed as the contacts 2, 3 are opened by removal of the check as will be described below.

As shown in Figure 3, the motor 4 drives a shaft 8 which is mounted in the motor frame and a side plate 9 and which has fixed to it a gear 10. This gear meshes with an idler gear 11 mounted on the side frame 9 and which in turn drives the clutch gear 12. The gear is mounted to rotate freely on shaft 13 (see Figure 10) and carries fixed to it a clutch plate 14 which is provided with four equally spaced holes 15.

A clutch body 16 is fixed to a locking sector 17 which in turn is fixed to a hub 18. The hub also has fixed to it a segment gear 19, a second locking sector 20 and a second sector gear 21 while the hub itself is connected to drive the shaft 13.

The clutch body is formed with an annular groove 22 and with a bore 23 which is disposed parallel to the shaft 13 but eccentric thereto. In this bore is disposed a cylindrical clutch element 24 the inner end of which rests on a spring 26 and a lateral notch 27 which is adapted to receive the bevelled end of an actuating element 28. The clutch element 24 is held against rotation about its axis by a pin 25 which is fixed in the clutch body 16 and which enters a groove 25' in the pin. Both the groove and the notch each have an inclined and a straight side wall and the notch is so positioned that when the clutch element is in the engaged position shown in Figure 10, there will be a space between the inclined wall of the notch and the straight wall of the groove to permit entrance of the end of the element 28. The end of the clutch element 16 adjacent clutch plate 14 is formed as a lever actuating cam 29 which cooperates with a follower 30 shown in Figure 9 to hold lever arm 56 in actuated position as will be described.

Mounted to rotate in bearings in the frame members 9 and 31 is a crank shaft 32 (see Figures 2, 3 and 6). Fixed to rotate with the shaft and adjacent the frame member 9 is a full stroke cam 33 while the gear 34 and locking sector 35 are disposed adjacent the member 31, with sector 35 located between the gear and the cam. On the other side of frame member 31, the crank 36 is fixed to the shaft. The full stroke cam has a notch 37 in its periphery.

The sector 35 is positioned to cooperate with the sector 17 on shaft 13 while the gear 34 is adapted to mesh with segment gear 19 on that shaft.

Another shaft 38 is mounted for rotation in frame members 31 and 39 as shown in Figure 13. Fixed on said shaft 38 at one end are a locking sector 40 and a gear 41 which are adapted to interengage with the sector 20 and gear 21 on shaft 13 described above.

Fixed to the shaft between the frame members is a hub 42 which has fixed to it on one end a Geneva gear actuator cam or timer 43 and a Geneva gear control cam 44 which is formed of two disks 44' and 44" which are spaced by flanged studs 45.

On the other end of the hub 42 are fixed a register drive gear 46 which has groups of teeth 47 spaced about its periphery, a locking disc 48, and a register selecting cam or selector 49 which is made up of two formed discs 50 and 51. Nuts 52 on the studs hold the various parts in predetermined relation with each other.

Pivotally mounted on frame member 9 as on screw 53 is an L-shaped lever 54 having a horizontal arm 55 which is provided with a weight 55' and a vertical arm 56.

Fixed on the bedplate 57 of the device and spaced therefrom is a plate 58 which carries a guide 59. A flanged push rod 60 is guided in the guide 59 and plate 58. The pushrod and its flange are normally urged downward by gravity so that the flange will normally rest against the plate 58. The lower end of the rod extends below the bedplate and the upper end lies under arm 55 of the lever so that the lever may be manually rotated in a clockwise direction.

The upper end of the arm 56 is formed into the cam follower 30 described above.

Attached to the arm 56 and immediately adjacent cam follower 30 is a plate 61 which is formed with the clutch actuating element 28. This plate is also provided with an opening 62 which receives a pin by means of which a link 63 is attached to the plate. The other end of the link is pinned to the armature 64 of the solenoid 5.

Also attached to the top of arm 56 is an upwardly projecting lever 65 which is adapted to contact a pin 66 set in a triangular pawl 67 which is pivoted on pin 68 fixed in a frame element 69. The pin is received in an opening 70 in the pawl. The nose 71 of the pawl is adapted to enter the notch 37 in cam 33. The end 72 of the pawl is adapted to abut a pin 73 also fixed in member 69.

The contact 7 is fixed to an arm 74 which is pivoted on member 69 at 74' and a second arm 75, integral with the first, carries a pin 76 which enters an elongated slot 77 in the end 72 of the pawl. A spring 78 is coiled about the pivot 74' and one end engages the pin 73 while the other end engages the arm 75 and tends to move it in a switch opening direction.

The frame member 79 in which is formed the chute 1 (see Figure 1) is provided at one end with an adjustable anvil 79' which is adapted to be fixed in place after being adjusted.

Also formed in this frame member 79 is a horizontal guide way 80 in which is mounted a slide 81. Fixed to the slide is a rack 82 which is adapted to mesh with a sector 83 mounted on a lever 84 which is pivoted at 85 to the frame member 31 as shown in Figures 1 and 5.

Pivoted to the frame member 31 at 86 is a lever 87 which carries a roll 88 at its lower end. Pivoted at 89 to the lever 84 is a lever 90. A link 91 pivotally connects the lower end of lever 90 with the central portion of lever 87.

The left end of link 91 is formed with a notch 92. Pivotally mounted on lever 84 at 93 is a latch pawl 94. A pin 95 on the pawl is engaged by a spring 96 which is mounted on the pivot 93. The spring urges the pawl in a counterclockwise direction toward engagement with notch 92. A pin 97 set in lever 84 is adapted to engage the pawl and lift it from the notch as is shown in Figure 5 and described below.

As viewed in Figures 1 and 5, the lever 84 is shown to underlie the other levers and links described above. This is done for the sake of clarity of showing. Actually the lever 84 overlies these links and levers so that the observer would be actually looking through the lever 84 to see the other parts as shown (see Figures 3 and 20 for the actual relations).

A link 98 connects the central portion of lever 90 with the crank 36 described above, from which motive power is derived.

A lever 99 pivoted at 100 on frame member 31 engages the roll 88 and a spring 101 anchored to a fixed element and to the lever 99 tends to urge it in a counterclockwise direction so that the lever 87 will be rotated in a like direction about its pivot 86.

Referring again to Figure 1 it will be seen that the contacts 2 and 3 are carried by the check receiver 102 which is made of insulating material and which is fixed to the rack 82 so as to reciprocate therewith.

A stationary contact 105 set in a fixed insulator 106 is adapted to be engaged and disengaged by contact 2. A spring 107 urges contact 2 downwardly into engagement with 105 and a pin 108 riding in an elongated slot in element 102 limits the vertical movement of contact 2. The insulator 106 is beveled at 106' to facilitate the reengagement of the contacts upon return of the rack and slide to the Figure 1 position.

A check or a plurality of checks dropped into chute 1 will come to rest in the receiver 102 and will connect the contacts 2 and 3 electrically. A movable stop 115 which is fixed to slide 81 as shown in Figure 17 will engage the check lying nearest the slide and, as the slide moves, the stop will move the check 116 into engagement with the anvil 79' and will come to rest for a purpose later to be described. The stop must, of course, be slightly thinner than the thinnest check which will be measured so that only one check at a time will be advanced by it.

An angle plate 109 is pivotally mounted on frame member 110 at 111 and has its turned end 112 directed inwardly toward the slide 81 and is held inwardly by a relatively strong spring 113 so that as the slide 81, stop 115 and the check 116 engaged by them are moved toward the anvil, the engaged check will force its way past the plate 109 but the other checks which are not engaged will be held back in the region of the chute by the angle plate.

As is clearly shown in Figures 15 and 17, a bracket 117 is fixed on frame member 110 and is perforated to slidably carry one end of a plunger rod 118. The other end of the rod carries a button 119 which passes through the angle plate 109 and the frame 110 and is disposed adjacent the receiver 102 when it occupies the check receiving position.

A forked lever 120 is pivoted at 121 to the frame 110 and its forked, curved end 122 is adapted to straddle the rod 118. A spring 123 is supported on the rod and is seated at one end on the button 119 and at its other end on the end 122 of the lever 120 as shown in Figure 17. An outer stop collar 124 limits the inward motion of the rod by coming into contact with the bracket and an inner, flanged, stop collar 125 limits the outward movement of the rod in the same way.

A pair of ears 126 (Figures 15 and 16) project from and are carried by slide 81 and support between them a shaft 127 on which is mounted a roll 128. As the slide moves from check receiving to check locking position, the roller forces the lever 120 counterclockwise (Figure 16) and compresses spring 123 against the button so that the latter will press against the checks in the receiver and press the one adjacent the slide 81 firmly against the slide so that it will be picked up by the stop 115 and will be moved forward under 109.

A pawl 130 is pivoted at 131 to the bracket 117 and is urged in a counterclockwise direction (Figure 16) by spring 132 (see Figures 15 and 17). The end 133 of the pawl is positioned to engage the flange of collar 125 and the other end is adapted to engage the bent down end 134 of a lever 135 which is fixed to shaft 136 mounted in bearings 137 on frame 110. Lever 135 has an edge portion 138 which is adapted to be engaged by a roll 139 also mounted on shaft 127.

As the slide returns to the normal position, the forked lever 120 will be rotated in a clockwise direction under the action of spring 123, however, the button 119 will still protrude into the check receiving chamber 102. As the slide 81 nears its initial position the roller 128 drops into opening 250 in lever 120 and a roller 251 which is mounted on shaft 252 and which bears on the inner edges 253 of lever 120 thereupon enggaes a cam 254 on lever 120 forcing this lever to its maximum clockwise position (Figure 16). In passing to this position, the forked end 122 of lever 120 engages collar 125 and moves rod 118 outwardly to withdraw the button 119 clear of the chamber so that additional checks may be deposited in the receiver.

A blocking lever 140 is mounted for free rotation about shaft 136 and is adapted to enter a slot 141 in frame 110 so as to block chute 1 so that checks placed in the hopper will not descend through the chute to the check receiver 102 under conditions to be outlined below. A pin 142 projects from the lower surface of the lever and a spring 143 normally urges the lever toward chute blocking position.

Normally the spring 145 holds lever 140 out of the chute since the spring 145 is more powerful than spring 143. On each actuation of the slide to the check locking position, the roll 139 will actuate lever 135, shaft 136 and lever 144 against the resistance of spring 145 so that lever 140 will be moved to chute blocking position by spring 143. Should it occur that such a number of checks are deposited in the receiver 102 that the button cannot enter the check receiving chamber a sufficient distance to permit rotation of pawl 130 far enough to clear the downwardly bent end 134 of lever 135, then on the next rotation of lever 135 by roll 139, the pawl 130 will block the return of lever 135 under action of spring 145 and shaft 136. The blocking lever 140 will accordingly remain held in the chute by spring 143 and the chute will be blocked so that no more checks may enter. To permit them to enter might cause the slide and its associated parts to jam.

Shown also in Figures 15 and 16 is an adjustment mechanism 146 for the anvil 79'. Shown also in these figures is a swinging bracket 147 which is pivoted at 148 and which carries a knurled roll 149. This roll is mounted by means of a roll type clutch on the shaft—so that it will rotate in a clockwise direction, Figure 16, but will not rotate in a counterclockwise direction. It will thus act as a brake upon the check during the return stroke of the slide. The bracket is spring pressed toward the slide and is adapted to engage the check as it is clamped between the stop 115 and the fixed stop or anvil 79'. As the stop 115 and receiver 102 are withdrawn, the roll tends to hold the check so that it will be ejected from the receiver and can pass to the display receptacles (not shown).

Referring now to Figures 1, 5 and 20, the lever 87 carries a pin 150 which enters a grooved collar 151 mounted on a push rod 152 which is mounted in bearings 153.

Fixed to the rod is a hub 154 which carries levers 155 and 156 and a hub 157 having a lever 158. Slidably mounted on the rod is a hub 159 carrying a lever 160. A shaft 161 is fixed in levers 156 and 158 and slides through a hole in lever 160. A slotted bracket 162 embraces lever 160 and prevents it from sliding with respect to rod 152.

The lever 155 is provided with a yoke end in which is mounted a roll 163 which is adapted to be actuated by the cams 164 on the timer 43, Figure 13.

Referring to Figure 14, a shaft 165 is mounted in frames 31 and 39. A pin 170 is provided at one end with a head 166, and a spring 167 is confined between frame 31 and the head. A shifting frame 168 is mounted to slide on shaft 165 and on 169 and carries the pin 170 which is slidable in frame 31.

A pinion 171 integral with 165 having its alternate teeth 172 cut away at both ends, is fitted in the frame and is mounted for rotation therein so that it will be shifted by the frame to the left (Figure 14) when the rod 152 is actuated as described, so that all of the teeth will engage the actuator gear 46 (Figures 12 and 13).

When the pinion is held in its nonengaged position (Figure 14) by spring 167, the locking sector 48 will engage the two nearest long teeth of the pinion and hold the pinion against rotation.

An upwardly projecting finger 173 on the frame 168 is adapted to enter the gates 174 in element 44' (Figures 11 and 13) and to be held in the groove 44 formed by elements 44' and 44''. This structure is adapted to hold pinion in mesh with actuator gear 46 for the length of time required to advance the selected register a unit amount or a predetermined multiple of unit amounts, as in the case of a register which is actuated by several checks of different values.

The contact between cams 164 and roll 163 is held just long enough to insure engagement of finger 173 in the groove and is then terminated. The cam lugs 175 and spring 167 force finger 173 out of the groove 44 when the period of connection is to be terminated.

The positioning of the cams 164 on the timer relative to the gates 174 is determined by the angular distance between finger 173 and roll 163 measured with the shaft 38 as a center. For instance the ten cent cam 164' (Figure 11) is so spaced from the gate 174', which opens into that portion of groove 44 which lies behind that portion of wall 44' and which is numbered 441 (Figure 11), that as roll 163 is raised by the cam 164' the finger 173 will enter the gate 174' and will be held, upon further rotation of the shaft 38, in the groove 44.

It will also be seen from an inspection of Figures 11 and 12 that the gear teeth 47' which correspond in extent to the actuation required by the ten cent register (to be described) are disposed in the same region as the wall 441, so that as the finger 173 is locked in groove 44, the pinion 171 will be driven the required distance by the teeth 47'.

The movement of pinion 171 is transmitted to gear 176 which is mounted on shaft 169 described above. As shown in Figures 1, 11, and 12 the shaft 169 is disposed horizontally adjacent shaft 165 but in Figure 3 it is shown out of position for the sake of clarity. The shaft 169 carries a gear 177 which meshes with a gear 178. The latter is mounted on a hub 179 which carries a bevel gear 180. The hub is freely mounted on shaft 165 (Figure 3).

The bevel gear 180 meshes with a bevel gear 182 which is mounted on a selector shaft 183 in such manner that it will transmit rotation to the shaft while at the same time it will permit sliding of the shaft in a longitudinal direction. Bracket 181 is fixed to a frame member not shown and holds the gear 182 in mesh with 180. The locking plate 183' is fixed to the hub of 182 and is also held in place by the bracket.

The shaft is provided at its ends with gears 184 and 185 respectively and at an intermediate portion with a groove 186 which is adapted to receive a shift lever 187.

Registers 188, 189, 190 and 191 are disposed with their drive shafts parallel with shaft 183 and spaced therefrom above and below it. The register drive shafts are provided with gears 192, 193, 194 and 195 respectively. Gears 192 and 193 are adapted to mesh with gear 185 and are disposed in different planes so that the shaft 183 and gear 185 will have to be shifted to effect engagement with one or the other of them.

Similarly the gears 194 and 195 are adapted to mesh with gear 184 and are disposed in different planes so that a shift of the shaft 183 and gear 184 is required to effect engagement of one or the other of them.

The relation of gears 192 to 194 is such that when the gear 185 is in mesh with either 192 or 193 the gear 184 will be out of mesh with gears 194 and 195. In the same way when gear 184 meshes with either gear 194 or 195, the gear 185 will be out of mesh with both of its associated gears.

The shift lever 187 which controls the selection of the registers is pivoted at 196 to frame 39. A second lever 197 is also pivoted at the same point and the two levers are fixed together at 198 by a screw and slot connection which permits adjustment of one lever relative to the other.

The lever 197 reaches up to a point adjacent the selector cam 49 (Figures 12 and 13) and carries a pin 198 which engages the cam and serves as a follower.

The cam 49 (Figure 12) is formed with five rest portions; 189' reaching from A to B; 188' reaching from C to D; 191' reaching from E to F; 188'' reaching from G to H and 190' reaching from I to J. Portion 189' is disposed farthest from the center of shaft 38; 188' is next farthest; 190' is next and 191' is nearest the shaft while 188'' has the same radius as 188'. It will be seen therefore that the lever 197 will be moved in each direction from a medium radius as the cam rotates and will accordingly shift shaft 183 from one side of its neutral position to the other so that the register 189 will be driven when section 189' of the cam is engaged by pin 198; register 188 will be actuated when either section 188' or 188'' is in position; register 190 will be actuated when section 190' is in position and register 191 will be actuated when section 191' is in position.

It will be noted by comparing Figures 11 and 12 that the cam 164 is in juxtaposition with section 189' so that the check adapted to set up roll 163 before cam 164 will be accumulated in register 189. Similarly cams 164' and 164² being adjacent section 188' their associated checks will be accumulated in register 188 as will that of cam 164⁴.

The cam 164³ is adjacent section 191' and its check will be accumulated in register 191 while the check corresponding the cam 164⁵ will be accumulated in register 190 since the cam is adjacent portion 190' of cam 49.

Usually cams 164', 164², and 164⁴ are the ones brought into action upon the deposit of a dime, a nickel and a penny respectively while cams 164, 164³, and 164⁵ are brought into action upon the deposit of tokens of increasingly large diameter. However, tokens having the same diameter as the coins will produce the same registration as the coins. Frequently a nickel sized token is used and it will be registered the same as a nickel.

Preferably the sections of cam 49 will lead the cams 164 slightly so that the register will be selected before the actuator gear is connected with the register drive train 176, 169, 177, 178, 180 and 182.

The shaft 38 carries a locking plate 38' which is adapted to cooperate with the locking element 183' on shaft 183. The latter is provided with equally spaced notches in its periphery which are adapted to permit the passage of the projections on the outer periphery of 38' which are unevenly spaced to provide clearance at the times when both plates may be in motion. In the rest position of shaft 38 a projection of 38' is in a groove in plate 183' so as to lock the plate and the associated drive train. The other projections on 38' lock the plate 183' in all positions in which there is no possibility that the drive train will be actuated.

Modified check calipering system

In Figure 21 is shown a modified form of check calipering means. The lever 84 and rack 82 are all as described above. However, a link 202 is pinned to crank 36 and has an elongated slot 203 which receives a pin 204 which is fixed in lever 84. A heavy spring 205 connects link 202 with pin 204.

A link 206 is pivoted at 207 on 84 and has a slot 208 which engages a pin 209 in lever 210 which is pivoted at 211 to frame 31.

The remainder of the mechanism which connects lever 210 to rod 152 is the same as disclosed in the preferred form.

Operation of preferred form

When one or more checks are deposited in the hopper 1', the check or checks will descend through the chute 1 and will come to rest in the receiver 102 on the contacts 2 and 3. As will be seen from Figure 1 and the wiring diagram Figure 4, a circuit will be closed by the check through contacts 2—3, normally closed contacts 2—105, normally closed switch 220 and the solenoid 5. Energization of solenoid 5 closes switch 6—7 and establishes a circuit through motor 4 and through thermostatic switch 220.

The solenoid will, upon energization, rotate the lever 56 in a clockwise direction (Figures 2 and 10) and will withdraw the clutch control element 28 from engagement with the pin 24 so that the latter will be forced into engagement with clutch disc 14. As the motor rotates and drives gears 10 and 11 in the directions shown by the arrows, one of the openings 15 in the disc will become aligned with the pin and there will be a positive drive from the motor to the shaft 13 through the clutch body 16.

Operation of lever 56 by the solenoid causes the arm 65 to engage pin 66 of the full stroke pawl 67, whereupon the pawl rotates on its pivot 68 and closes the contacts 6 and 7 so as to maintain the motor circuit closed.

Rotation of the clutch body causes the cam 29 to act on the follower 30 which is also connected with lever 56 to hold said lever in the position to which it is moved by the solenoid. This cam is so formed that it will permit counterclockwise rotation of the lever near the end of a revolution of the cam so as to position the clutch control element 28 to disengage the clutch pin from the disc 14 substantially at the end of the revolution. Engagement of the projection 29' Figure 9 on the cam with element 30 stops the rotation of shaft 13 in its initial position. This clutch permits the cycling mechanism to come to rest in a predetermined position each time, while the motor and its associated parts may coast to a stop thereafter.

Cycling mechanism

The clutch is thus responsible for securing a full revolution of shaft 13 so that the gears 21 and 19 fixed to the shaft will have the same movement imparted to them as will locking sectors 17 and 20.

The gears 19 and 34 are shown in the starting position in Figure 6 and it will be seen that shaft 32 will be driven immediately when shaft 13 is rotated. During the first one sixth revolution of shaft 13, the gear 34 and crankshaft 32 will be rotated a half revolution whereupon the locking sectors 17 and 35 will be engaged to hold the crankshaft motionless while the shaft 13 continues to rotate.

As shown in Figure 7, the rotation of shaft 13 through the portion of its cycle just described serves to disengage the locking sectors 20 and 40 and to bring the gears 21 and 41 in mesh. The number of teeth on gears 21 and 41 is such that the next two hundred forty degrees of revolution of gear 21 on shaft 13 will induce a complete rotation of gear 41 and of the shaft 38 which carries the register connector cam 49, the timer 43, the actuator gear 46 and the cam 44.

Upon completion of rotation of shaft 38 the locking sectors 17 and 35 will have been disengaged and the gears 19 and 34 will again be meshed so that shaft 13 will rotate the crankshaft an additional half revolution to its initial position. During this operation the locking sectors 20 and 40 will have been engaged so as to hold shaft 38 against accidental rotation.

It will be seen that the full stroke cam 33 will be rotated with shaft 32 so that even though the lever 56 is returned by its counterweight 55' upon rotation of cam 29 as described above, the pawl 67 will be held in the switch closing position until the shaft reaches its final position in which the notch 37 will be positioned so that the projection 71 of the pawl may enter it and permit spring 73 to open the contacts 6 and 7.

An emergency operator 60 is provided for starting the motor in the event a check becomes lodged in the receiver but fails to connect the contacts 2 and 3 or if such operation is desirable for any other reason. The plunger 60 when it is pressed in manually will rock lever 56 clockwise in the same manner as would solenoid 5.

Check calipering and selecting mechanism

As just described the crankshaft is actuated through a half revolution from one dead center position of the crank to the other and then, after a period of rest, it is returned to its initial dead center position.

In rotating through the first portion of its movement, the link 98 will be pulled to the left (Figures 1 and 5) and the lever 90 will be pivoted about the point of engagement of the pawl 94 with notch 92 in link 91 so that a pull will be transmitted to the lever 84 which is rotated in a counterclockwise direction. This induces a leftward movement of the rack 82 and the slide 81. The check receiver 102 is fixed to and moves with the side and as this occurs, the contact 2 slides out of engagement with the contact 105. The motor circuit is not interrupted, however, because the switch contacts 6 and 7 are in engagement as described above.

As the lever 84 moves to the left, the pin 97 engages pawl 94 and disengages it from the notch 92 in link 91. When the movable stop 115 on slide 81 forces the check 116 into engagement with the anvil 79', the movement of the slide is stopped. This is the position of the parts shown in full lines in Figure 5. The crank 36 will not have reached its dead center position and consequently the remainder of the movement of the crank and link 98 will be transmitted to the lever 90 which now pivots about the point 89 and pulls on link 91 which causes lever 87 to pivot about point 86. The push rod 152 which is connected with the lower end of lever 87 will accordingly be moved to the left to position the roller 153 in the path of movement of one of the cams 164 on the timer 43. The parts are shown in this position by dotted lines in Figure 5.

The roll 88 which is fixed to lever 87 engages the return lever 99 and movement of the lever 99 about pivot 100 tensions the spring 101 which serves to return the parts to initial position when the cycle of operation is completed.

The roll 163 having been thus positioned, the cycle of shaft 38 will be begun. Rotation of the timer 43 causes a cam 164 to rotate lever 155 clockwise, Figure 14, and causes lever 160 to rotate in the same direction to push pinion shift frame 168 to the left and cause the pinion to mesh with teeth 47 on the actuator gear 46. It will also force finger 173 on the frame through a gate 174 so that further rotation of the shaft 38 will cause the shift frame to be held in position in groove 44 against the action of spring 167.

Meanwhile, the cam 49 will have actuated pin 198, levers 197, 187, shaft 183, and gears 184 and 185 to bring one or the other of said gears into engagement with the proper register gear so that the register will be connected to the train including pinion 171, gears 176, 177, 178, 180 and 182. This train is now driven by the actuator gear 46 the required amount whereupon the finger 173 will be forced out of groove 44 by the spring 167, the cam 175 and the shifter frame 168 to disengage the pinion 171 from the gear 46. The locking sector 44 will then engage the two adjacent long teeth of the pinion 171 on the right of teeth 172 and lock the driving train.

The shaft 38 and its associated parts then continue the cycle without further actuation of the registers although the cam 49 connects each register in series with the drive train even though no actuation thereof is effected.

Upon completion of the cycle of shaft 38, this shaft is locked as described above and the crankshaft 32 is again rotated the rest of its cycle.

This returns the check receiver 102 to the Figure 1 position to pick up another check. The mechanism for driving the slide and all of the associated parts are also returned to the Figure 1 position during this period and the rod 152 is returned to its initial position by the lever 99 and spring 101.

The lever 56 is permitted to be returned to the Figure 2 position by the cam 29 and under the influence of counterweight 55' so that the clutch actuator 28 will be in position to disengage the clutch at substantially the end of the revolution of shaft 13. The full stroke cam 33 approaches the position with notch 37 adjacent pawl 71 so that the switch contacts 6 and 7 will be opened. Also, the stop 29' will finally engage the element 30 and stop the shaft 13 and its associated elements in their initial position.

If another check is positioned in the receiver 102 either by reason of an addional check being deposited or by reason of several having been deposited simultaneously in the first instance, the next check will settle on the contacts 2 and 3 and since the contacts 2 and 105 have again been made by the slide on its return to the check receiving position the cycle will be started again.

As the slide moves forward, the roll 128 (Figure 15) will move the lever 120 counter-clockwise to compress spring 123 and to force the button 119 and the checks which are in the receiver toward the slide. The check which is disposed adjacent the slide will be engaged by the stop 115 and will be stripped from the rest of the checks by the turned end 112 of the stripper or angle plate 109. The check engaged by stop 115 will thus be carried forward into engagement with the anvil while the rest of the checks are held back by the stripper so that they may in turn be forwarded for measurement.

The calipered check, when it is released by the movable stop 115, will be held by its inertia and by the knurled roll, which rotates only in the clocwise direction (Figure 16) due to the clutch connection between the roll and its shaft, at a point adjacent the anvil 79' and will thereafter drop down into a display chamber which is not shown, or to any other suitable receptacle.

Should it be attempted to deposit additional checks when the receiver 102 is full, the hopper will be blocked by the mechanism shown in Figures 15 to 17 and described above.

In the event that the motor overheats, the thermal switch 228 will open to break the motor circuit and will close again when the motor temperature has fallen, to resume the cycle at the point of interruption.

Should the cycle be initiated as by operation of the manual push rod 60 shown in Figure 2, the cycle of operation of the device will be carried out as described above with the exception that the movable stop, not being arrested by a check, will travel a distance sufficient to take up the entire predetermined movement of the crank. Consequently, there will not be any motion imparted to mechanism which sets up the roll 163 in the path of a cam 164. Consequently, the pinion 171 and its associated parts will not be driven by the actuator gear and no registration will be effected on any of the registers.

*Operation—Modified calipering mechanism*

As shown in Figure 21, the crank 36 pulls on link 202 and this pull is transmitted through spring 205 and pin 204 to lever 84. The link 206 moves far enough to cause the end of slot 208 to engage the pin 209 whereupon lever 210 will be moved to set up the rod 152 to set up roll 163 in the path of a cam 164. The excess movement of crank 36 merely moves the link 202 against the action of spring 205 to complete the first half of its cycle. Thus the lever 210 and push rod 152 will be picked up at a fixed point and will be moved a distance depending upon the diameter of the check so as to set up the roll 163 accordingly.

If no check is presented for calipering, the lever 84 will be moved a maximum distance, taking up the full stroke of the crank, and the roll 163 will be positioned at a point adjacent shaft 38 where no cam 164 is located so that there will be no register actuation during the cycle of the mechanism connected with the shaft.

It is apparent that various changes may be made in the size, form, construction and arrangement of parts without departing from the spirit of the invention; and applicants do not, therefore, desire to be limited to the specific forms shown and described herein by way of illustration of a preferred form, but instead, desire protection falling fairly within the scope of the appended claims.

We claim:

1. In a check registering mechanism adapted to operate in a cycle, the combination of a plurality of registers corresponding to the checks adapted to be registered by said mechanism, a register drive train, check calipering means, means adapted to connect all of said registers, one at a time, with and to disconnect said registers from said register drive train in predetermined order during each cycle, and means conditioned by said check calipering means for operating said register drive train a predetermined distance when the latter is connected with the register corresponding to the calipered check.

2. In a check registering mechanism the combination of a plurality of registers each adapted to accumulate the value of a different check, a register drive train, register actuating means normally disconnected from said drive train, register selecting means operable through a cycle to connect and disconnect said registers in sequence with said drive train, check calipering means, and means conditioned by said check calipering means for connecting said register actuating means to said drive train when the latter is connected with the register adapted to accumulate value corresponding with the calipered check.

3. In a fare register the combination of a check registering mechanism operable through a cycle to accumulate the value of a check upon one of a plurality of registers, a check calipering mechanism adapted to caliper a check and to condition said registering mechanism to accumulate the value thereof on a register corresponding to the calipered check, said calipering mechanism being operable in a cycle comprised of a calipering and conditioning phase and a clearing phase, a drive mechanism for both said calipering and said registering mechanisms, control means adapted to connect said drive mechanism to actuate said calipering mechanism through its first phase, to thereupon connect said drive mechanism to actuate said registering mechanism through its cycle, and to finally connect said drive mechanism to actuate said calipering mechanism through its second phase.

4. In a check registering mechanism the combination of a check registering mechanism operable through a cycle to accumulate the value of a check on one of a plurality of registers, means for connecting and disconnecting said registers with said registering mechanism in predetermined sequence with said registering mechanism during each cycle, and a check calipering mechanism adapted to caliper a check and to actuate said registering mechanism when the register corresponding to the check calipered by said first named mechanism is connected therewith so as to accumulate in said connected register the value of the check which was calipered.

5. In a check registering mechanism the combination of driving means, check engaging means adapted to be moved to different stopped positions depending upon the diameter of the check engaged, register selecting and actuating means, a device adapted to be conditioned to start and to control the operation of said register selecting and actuating means, and connections between said driving means and both said check engaging means and said device, for moving said check engaging means to a stopped position and for thereupon conditioning said device.

6. In a check registering mechanism operable in a cycle, the combination of driving means operable through a predetermined distance during each cycle, check engaging means adapted to be moved to different stopped positions depending upon the diameter of the check engaged, register selecting and actuating means, a device adapted to be conditioned to control the operation of said last named means, connections between said driving means and both said check engaging means and said device, for moving said check engaging means to a stopped position during movement of said driving means through a portion of said predetermined distance, and for thereafter conditioning said device by moving it a distance proportional to the movement of said driving means through the remainder of said predetermined distance.

7. In a check registering mechanism the combination of a plurality of registers, register operating means comprising an actuator, a drive train and engageable means for connecting said actuator with said train, register selecting means comprising a connector operable through a cycle of phases and adapted to successively connect and disconnect said register with said train, a controller movable with said connector and having operator actuating means, one corresponding with each phase of said connector, a connecting means operator, and means for effecting engagement of said operator and a particular actuating means for causing engagement of said connecting means in a particular phase of said connector.

8. In a check registering mechanism the combination of a plurality of registers, register operating means comprising an actuator, a drive train and engageable means for connecting said actuator with said train, register selecting means comprising a connector operable through a cycle of phases and adapted to successively connect and disconnect said registers with said train, a controller movable with said connector and having actuating means, one corresponding with each phase of said connector, a connecting means operator, means for effecting engagement of said operator and a particular actuating means for causing engagement of said connecting means in a particular phase of said connector, check presenting means, and mechanism conditioned in accordance with the diameter of the check presented for effecting the engagement of said operator and actuating means during the phase corresponding to said check.

9. In a check registering mechanism the combination of a plurality of registers, register operating means comprising an actuator, a drive train and engageable means for connecting said actuator with said train, register selecting means comprising a connector operable through a cycle of phases and adapted to successively connect and disconnect said registers with said train, a controller movable with said connector and having actuating means, one corresponding with each phase of said connector, a connecting means operator, means for effecting engagement of said operator and a particular actuating means for causing engagement of said connecting means in a particular phase of said connector, and means for retaining said connector means engaged throughout the remainder of the phase in which it was engaged.

10. In a check registering mechanism the combination of a plurality of registers, register operating means comprising an actuator, a drive train and engageable means for connecting said actuator with said train, register selecting means comprising a connector operable through a cycle of phases and adapted to successively connect and disconnect said registers with said train, a controller movable with said connector and having actuating means, one corresponding with each phase of said connector, a connecting means operator, and means for effecting engagement of said operator and a particular actuating means for causing engagement of said connecting means in a particular phase of said connector, said actuator being adapted to transmit a predetermined movement to said train corresponding with the phase of said connector.

11. In a check registering mechanism the combination of a plurality of registers, register operating means comprising an actuator, a drive train and a normally disengaged means for connecting said actuator with said train, register selecting means comprising a connector operable through a cycle of phases and adapted to successively connect and disconnect said registers with said train, a controller movable with said connector and having actuating means, one corresponding to each phase of said connector, and a connecting means operator movable selectively into position to be operated by one of said actuating means to effect engagement of said connecting means in a particular phase of said connector.

12. In a check registering mechanism operable in a cycle, the combination of driving means operable through a predetermined distance during each cycle, a fixed stop, a movable stop and means for presenting a check between said stops, a plurality of registers, a register actuator, and selecting means comprising a settable member for selectively connecting said actuator with one of said registers, means connecting said driving means with said movable stop and with said settable member so that said movable stop will be actuated to grip said check against the fixed stop during movement of the driving means through a portion of its distance and said settable member will be positioned during the movement of said driving means through the remainder of said predetermined distance.

13. In a check registering mechanism operable in a cycle, the combination of driving means operable through a predetermined distance during each cycle, and in one direction, a fixed stop, a movable stop and means for presenting a check between said stops, a plurality of registers, a register actuator, and selecting means comprising a settable member for selectively connecting said actuator with one of said registers, means connecting said driving means with said movable stop and with said settable member so that said movable stop will be actuated to grip said check against the fixed stop during movement of the driving means through a portion of its distance and said settable member will be positioned during the movement of said driving means through the remainder of said predetermined distance, said driving means being operable in the return direction to eject said check and to return said parts to their initial positions.

14. In a check registering mechanism the combination of a motor, a cycling mechanism, a check calipering means adapted to be actuated by said motor through said cycling mechanism, means for presenting a check to said calipering means, means controlled by said check for energizing said motor, and means actuated by said cycling mechanism for disconnecting and deenergizing said motor at the completion of a cycle.

15. In a check registering mechanism the combination of a motor, a cycling mechanism, a check receiving device, means for energizing said motor upon receipt of said check, means operable upon receipt of said check for connecting said motor with said cycling mechanism, and means under control of said cycling mechanism for disconnecting it from said motor at the end of a cycle.

16. In a check registering mechanism the combination of a check receiver, a chute for preseting checks to said receiver, a device associated with said receiver and movable from normal position to caliper said check and eject it from said receiver, a motor for actuating said device, means operable upon receipt of a check for energizing said motor, means operable upon energization of said motor for maintaining said motor energized after ejection of said check, and means for disabling said maintaining means upon return of said device to normal position.

17. In a check registering mechanism the combination of a check receiver for receiving a plurality of checks, a check calipering device associated with said receiver, check feeding means associated with said receiver for presenting said checks individually to said calipering device, said check calipering device being adapted to eject a check therefrom after it has been calipered and means under control of said calipering device for actuating said feeding means.

18. In a check registering mechanism the combination of a check receiver for receiving a plurality of checks, a chute for conducting checks to said receiver, a check calipering device associated with said receiver, check feeding means associated with said receiver for presenting said checks individually to said device, means under control of said calipering device for actuating said feeding means, and means in said chute for preventing the passage of additional checks to said receiver when it is full.

19. In a check registering mechanism the combination of a plurality of registers, register operating means comprising an actuator, a drive train and engageable means for connecting said actuator with said train, register selecting means comprising a connector operable through a cycle of phases and adapted to successively connect and disconnect said registers with said train, a controller movable with said connector and having actuating means, one corresponding with each phase of said connector, a connecting means operator, means for effecting engagement of said operator and a particular actuating means for causing engagement of said connecting means in a particular phase of said connector, and locking means associated with said controller for locking said drive train against movement while said connecting means is disconnected.

20. In a check registering mechanism operable in a cycle, the combination of driving means operable through a predetermined distance during each cycle, a fixed stop, a movable stop and means for presenting a check between said stops, a plurality of registers, a register actuator, selecting means comprising a settable member for selectively connecting said actuator with one of said registers, and means connecting said driving means with said movable stop and with said settable member so that said movable stop will be actuated to grip said check against the fixed stop during movement of the driving means through a portion of its distance and said settable member will be positioned during the movement of said driving means through the remainder of said predetermined distance, said connecting means comprising a link connected at one end to said movable stop and at the other end to said settable member and intermediate said ends to said driving means, whereby said settable member will be moved in inverse proportion to the diameter of the check.

21. In a check registering mechanism operable in a cycle, the combination of driving means operable through a predetermined distance during each cycle, a fixed stop, a movable stop and means for presenting a check between said stops, a plurality of registers, a register actuator, selecting means comprising a settable member for selectively connecting said actuator with one of said registers, and means connecting said driving means with said movable stop and with said settable member so that said movable stop will be actuated to grip said check against the fixed stop during movement of the driving means through a portion of its distance and said settable member will be positioned during the movement of said driving means through the remainder of said predetermined distance, said connecting means comprising a link connected to said movable stop, said settable member and said driving means.

HUGO J. BAUR.
THOMAS E. KULO.